US 8,867,370 B2

(12) United States Patent
Norair

(10) Patent No.: US 8,867,370 B2
(45) Date of Patent: Oct. 21, 2014

(54) METHOD AND APPARATUS FOR ADAPTIVE TRAFFIC MANAGEMENT IN A RESOURCE-CONSTRAINED NETWORK

(75) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 179 days.

(21) Appl. No.: 13/408,447

(22) Filed: Feb. 29, 2012

(65) Prior Publication Data

US 2012/0224491 A1   Sep. 6, 2012

Related U.S. Application Data

(60) Provisional application No. 61/464,376, filed on Mar. 2, 2011.

(51) Int. Cl.
*H04W 4/00* (2009.01)
*H04L 1/00* (2006.01)

(52) U.S. Cl.
CPC ............ *H04L 1/0061* (2013.01); *H04L 1/0083* (2013.01)
USPC ........... 370/242; 370/350; 370/328; 370/336; 455/434; 455/436

(58) Field of Classification Search
USPC ................. 370/254, 350, 392, 328, 335, 315, 370/330–331; 707/3, 5, 723, 706; 455/435.1, 434, 522, 436
See application file for complete search history.

(56) References Cited

U.S. PATENT DOCUMENTS 5,338,625 A   8/1994  Bates
5,615,366 A *  3/1997  Hansen ................................. 1/1

(Continued)

FOREIGN PATENT DOCUMENTS

| EP | 1321009 B1 | 1/2007 |
|---|---|---|
| WO | 2006001556 A1 | 1/2006 |
| WO | 2009023592 A2 | 2/2009 |

OTHER PUBLICATIONS

PCT Int'l Searching Authority, Notification Concerning Transmittal of the Int'l Search Report and The Written Opinion of the Int'l Searching authority or the Declaration in Int'l application No. PCT/US2012/027386 dated Oct. 16, 2012.

(Continued)

*Primary Examiner* — Charles C Jiang
*Assistant Examiner* — Mohamed Kamara
(74) *Attorney, Agent, or Firm* — McAndrews, Held & Malloy, Ltd.

(57) ABSTRACT

An electronic device may utilize or support adaptive traffic management in a resource-constrained network. The adaptive traffic management may comprise applying a multi-stage filtering to packets received by the electronic device, wherein each stage of the multi-stage filtering may comprises a validation check and a failure of any validation check of any stage when handling a packet terminates the handling of the packet. The adaptive traffic management may comprise apply an adaptive search function, whereby when the number of search responses received by the electronic device exceeds a particular maximum response threshold, one or more criteria for modifying search requests may be selected, to reduce number of expected search responses, and the modified search criteria may be applied to generated modified search command(s) that are applied in the search function.

16 Claims, 10 Drawing Sheets

(56) References Cited

U.S. PATENT DOCUMENTS

| | | | |
|---|---|---|---|
| 5,729,557 A | 3/1998 | Gardner et al. | |
| 5,959,281 A | 9/1999 | Domiteaux | |
| 6,115,379 A | 9/2000 | Flanders et al. | |
| 6,307,846 B1 | 10/2001 | Willey | |
| 6,330,700 B1 | 12/2001 | Morris | |
| 6,381,243 B1 | 4/2002 | Ekstedt | |
| 6,388,997 B1 | 5/2002 | Scott | |
| 6,424,301 B1 | 7/2002 | Johnson | |
| 6,452,569 B1 | 9/2002 | Park | |
| 6,665,308 B1 | 12/2003 | Rakib | |
| 6,700,491 B2 | 3/2004 | Shafer | |
| 6,705,531 B1 | 3/2004 | Norton | |
| 6,714,559 B1 | 3/2004 | Meier | |
| 6,771,985 B1 | 8/2004 | Iinuma | |
| 7,009,941 B1* | 3/2006 | Uchino | 370/254 |
| 7,233,603 B2 | 6/2007 | Lee | |
| 7,280,555 B2 | 10/2007 | Stanforth | |
| 7,305,237 B2 | 12/2007 | Stephens | |
| 7,308,103 B2 | 12/2007 | Corcoran et al. | |
| 7,315,248 B2 | 1/2008 | Egbert | |
| 7,330,446 B2 | 2/2008 | Lee | |
| 7,369,512 B1 | 5/2008 | Shurbanov et al. | |
| 7,554,981 B2* | 6/2009 | Kecskemeti | 370/392 |
| 7,580,397 B2 | 8/2009 | Arai et al. | |
| 7,606,256 B2 | 10/2009 | Vitebsky | |
| 7,643,509 B2 | 1/2010 | Han et al. | |
| 7,672,284 B2 | 3/2010 | Sugar et al. | |
| 7,689,195 B2 | 3/2010 | Wu | |
| 7,698,463 B2 | 4/2010 | Ogier et al. | |
| 7,735,116 B1 | 6/2010 | Gauvin | |
| 7,760,689 B2 | 7/2010 | Shin | |
| 7,805,129 B1 | 9/2010 | Issa | |
| 7,814,107 B1 | 10/2010 | Thirumalai et al. | |
| 7,890,839 B2 | 2/2011 | Iwami | |
| 7,962,361 B2 | 6/2011 | Ramchandani | |
| 8,035,488 B2 | 10/2011 | Shiotsu et al. | |
| 8,036,715 B2 | 10/2011 | Buck | |
| 8,325,665 B2 | 12/2012 | Kim | |
| 8,351,409 B2 | 1/2013 | Albert | |
| 8,554,271 B2 | 10/2013 | Wang et al. | |
| 2002/0025823 A1 | 2/2002 | Hara | |
| 2002/0078045 A1 | 6/2002 | Dutta | |
| 2003/0013475 A1* | 1/2003 | Yoshimura | 455/522 |
| 2003/0115369 A1 | 6/2003 | Walter | |
| 2003/0117996 A1* | 6/2003 | Lim et al. | 370/350 |
| 2003/0154243 A1 | 8/2003 | Crockett | |
| 2003/0183691 A1 | 10/2003 | Lahteenmaki | |
| 2004/0157631 A1 | 8/2004 | Stobart | |
| 2004/0218557 A1 | 11/2004 | Kim et al. | |
| 2005/0078038 A1 | 4/2005 | Takaki | |
| 2005/0083943 A1 | 4/2005 | Lee et al. | |
| 2005/0128086 A1 | 6/2005 | Brown | |
| 2005/0135291 A1 | 6/2005 | Ketchum et al. | |
| 2005/0139685 A1 | 6/2005 | Kozlay | |
| 2005/0174953 A1 | 8/2005 | Ho | |
| 2006/0002312 A1 | 1/2006 | Delattre et al. | |
| 2006/0088021 A1 | 4/2006 | Nelson et al. | |
| 2006/0091223 A1 | 5/2006 | Zellner | |
| 2006/0165024 A1* | 7/2006 | Iwami et al. | 370/315 |
| 2006/0175420 A1 | 8/2006 | Satou | |
| 2006/0219776 A1 | 10/2006 | Finn | |
| 2006/0220867 A1 | 10/2006 | Dixon | |
| 2007/0000316 A1 | 1/2007 | Lauer | |
| 2007/0010928 A1 | 1/2007 | Brusarosco | |
| 2007/0058661 A1 | 3/2007 | Chow | |
| 2007/0083924 A1* | 4/2007 | Lu | 726/13 |
| 2007/0099641 A1 | 5/2007 | Lastinger | |
| 2007/0125836 A1 | 6/2007 | McAllister et al. | |
| 2007/0136509 A1 | 6/2007 | Agami | |
| 2007/0183366 A1* | 8/2007 | Park | 370/331 |
| 2007/0232281 A1 | 10/2007 | Nakai | |
| 2007/0295074 A1 | 12/2007 | Kobayakawa | |
| 2008/0041936 A1 | 2/2008 | Vawter | |
| 2008/0057959 A1* | 3/2008 | Ida et al. | 455/435.1 |
| 2008/0069097 A1 | 3/2008 | Motegi | |
| 2008/0075123 A1 | 3/2008 | Fourcand | |
| 2008/0107060 A1 | 5/2008 | Andou et al. | |
| 2008/0130597 A1 | 6/2008 | Kalhan | |
| 2008/0164325 A1 | 7/2008 | Borracci | |
| 2008/0172357 A1 | 7/2008 | Rechis | |
| 2008/0186857 A1 | 8/2008 | Becker | |
| 2008/0186867 A1 | 8/2008 | Schoo et al. | |
| 2008/0209322 A1 | 8/2008 | Kaufman | |
| 2008/0228592 A1 | 9/2008 | Kotas | |
| 2008/0238621 A1 | 10/2008 | Rofougaran | |
| 2008/0256409 A1 | 10/2008 | Oran et al. | |
| 2008/0302177 A1 | 12/2008 | Sinnett | |
| 2008/0320139 A1 | 12/2008 | Fukuda | |
| 2009/0003376 A1 | 1/2009 | Horvat | |
| 2009/0006376 A1* | 1/2009 | Hendriks et al. | 707/5 |
| 2009/0034491 A1 | 2/2009 | Adams | |
| 2009/0055377 A1 | 2/2009 | Hedge | |
| 2009/0069049 A1 | 3/2009 | Jain | |
| 2009/0073070 A1 | 3/2009 | Rofougaran | |
| 2009/0113267 A1 | 4/2009 | Harrison | |
| 2009/0138948 A1 | 5/2009 | Calamera | |
| 2009/0141531 A1 | 6/2009 | Abedin | |
| 2009/0150646 A1 | 6/2009 | Allen | |
| 2009/0171749 A1 | 7/2009 | Laruelle | |
| 2009/0171947 A1 | 7/2009 | Karayel | |
| 2009/0196279 A1* | 8/2009 | Kim et al. | 370/350 |
| 2009/0210898 A1 | 8/2009 | Childress et al. | |
| 2009/0251295 A1 | 10/2009 | Norair | |
| 2009/0268674 A1 | 10/2009 | Liu | |
| 2009/0279652 A1 | 11/2009 | Sinha | |
| 2009/0286496 A1* | 11/2009 | Yavuz et al. | 455/127.1 |
| 2009/0292418 A1 | 11/2009 | Kuykendal | |
| 2010/0011156 A1 | 1/2010 | Yim | |
| 2010/0026589 A1 | 2/2010 | Dou | |
| 2010/0027558 A1 | 2/2010 | Han | |
| 2010/0036806 A1* | 2/2010 | Lam et al. | 707/3 |
| 2010/0052859 A1 | 3/2010 | Lossau | |
| 2010/0078471 A1 | 4/2010 | Lin | |
| 2010/0097946 A1 | 4/2010 | Celentano | |
| 2010/0097956 A1 | 4/2010 | Tauil | |
| 2010/0097957 A1 | 4/2010 | Pirzada et al. | |
| 2010/0118737 A1 | 5/2010 | Kim | |
| 2010/0177696 A1 | 7/2010 | Jung | |
| 2010/0179877 A1 | 7/2010 | Lam | |
| 2010/0181377 A1 | 7/2010 | Chen | |
| 2010/0190437 A1 | 7/2010 | Buhot | |
| 2010/0197261 A1 | 8/2010 | Zibrik et al. | |
| 2010/0228617 A1 | 9/2010 | Ransom et al. | |
| 2010/0232408 A1 | 9/2010 | Lim | |
| 2010/0256976 A1 | 10/2010 | Atsmon | |
| 2010/0261496 A1* | 10/2010 | Fukumoto et al. | 455/517 |
| 2010/0280904 A1 | 11/2010 | Ahuja | |
| 2010/0295681 A1 | 11/2010 | Burns et al. | |
| 2010/0303051 A1 | 12/2010 | Umeuchi et al. | |
| 2011/0003607 A1 | 1/2011 | Forenza et al. | |
| 2011/0007733 A1 | 1/2011 | Kubler et al. | |
| 2011/0011176 A1 | 1/2011 | Glocker | |
| 2011/0064013 A1 | 3/2011 | Liu et al. | |
| 2011/0074552 A1 | 3/2011 | Norair | |
| 2011/0112892 A1 | 5/2011 | Tarantino | |
| 2012/0001730 A1 | 1/2012 | Potyrailo | |
| 2012/0086615 A1 | 4/2012 | Norair | |
| 2012/0087267 A1 | 4/2012 | Norair | |
| 2012/0087350 A1 | 4/2012 | Norair | |
| 2012/0088449 A1 | 4/2012 | Norair | |
| 2012/0093151 A1 | 4/2012 | McFarland et al. | |
| 2012/0116694 A1 | 5/2012 | Norair | |
| 2012/0116887 A1 | 5/2012 | Norair | |
| 2012/0118952 A1 | 5/2012 | Norair | |
| 2012/0191848 A1 | 7/2012 | Norair | |
| 2012/0191901 A1 | 7/2012 | Norair | |
| 2012/0207141 A1 | 8/2012 | Norair | |
| 2012/0209716 A1 | 8/2012 | Burns | |
| 2012/0224530 A1 | 9/2012 | Norair | |
| 2012/0224543 A1 | 9/2012 | Norair | |
| 2012/0224590 A1 | 9/2012 | Norair | |
| 2012/0225687 A1 | 9/2012 | Norair | |
| 2012/0226822 A1 | 9/2012 | Norair | |
| 2012/0226955 A1 | 9/2012 | Norair | |

(56) References Cited

U.S. PATENT DOCUMENTS

2013/0017788 A1 1/2013 Norair
2013/0210461 A1 8/2013 Moldaysky et al.
2013/0238613 A1* 9/2013 Hu et al. ........................ 707/723

OTHER PUBLICATIONS

PCT International Searching Authority, Notification Concerning Transmittal of the International Search Report and The Written Opinion of the International Searching Authority, or the Declaration, in International application No. PCT/US2011/55118, dated Feb. 28, 2012. (25 pages).
PCT International Searching Authority, Notification Concerning Transmittal of the International Search Report and The Written Opinion of the International Searching Authority, or the Declaration, in International application No. PCT/US11/55082, dated Mar. 1, 2012 (13 pages).
PCT International Searching Authority, Notification Concerning Transmittal of the International Search Report and The Written Opinion of the International Searching Authority, or the Declaration, in International application No. PCT/US11/55934, dated Mar. 6, 2012 (11 pages).
PCT International Searching Authority, Notification Concerning Transmittal of the International Search Report and The Written Opinion of the International Searching Authority, or the Declaration, in International application No. PCT/US2011/055929, dated Jan. 30, 2012. (15 pages).
PCT International Searching Authority, Notification Concerning Transmittal of the International Search Report and The Written Opinion of the International Searching Authority, or the Declaration, in International application No. PCT/US2011/059292, dated Feb. 2, 2012. (12 pages).
PCT International Searching Authority, Notification Concerning Transmittal of the International Search Report and The Written Opinion of the International Searching Authority, or the Declaration, in International application No. PCT/US11/059304, dated Mar. 9, 2012 (11 pages).
PCT International Searching Authority, Notification Concerning Transmittal of the International Search Report and The Written Opinion of the International Searching Authority, or the Declaration, in International application No. PCT/US2011/060950, dated Mar. 16, 2012. (14 pages).
PCT International Searching Authority, Notification Concerning Transmittal of the International Search Report and The Written Opinion of the International Searching Authority, or the Declaration, in International application No. PCT/US12/22005, dated Mar. 29, 2012. (12 pages).
PCT International Searching Authority, Notification Concerning Transmittal of the International Search Report and The Written Opinion of the International Searching Authority, or the Declaration, in International application No. PCT/US12/22002, dated May 8, 2012. (13 pages).
PCT International Searching Authority, Notification Concerning Transmittal of the International Search Report and The Written Opinion of the International Searching Authority, or the Declaration, in International application No. PCT/US2012/025191 dated May 25, 2012 (8 pages).
PCT International Searching Authority, Notification Concerning Transmittal of the International Search Report and The Written Opinion of the International Searching Authority, or the Declaration, in International application No. PCT/US2012/025197 dated May 25, 2012 (7 pages).
PCT International Searching Authority, Notification Concerning Transmittal of the International Search Report and The Written Opinion of the International Searching Authority, or the Declaration, in International application No. PCT/US2012/027382 dated May 31, 2012 (10 pages).
PCT International Searching Authority, Notification Concerning Transmittal of the International Search Report and The Written Opinion of the International Searching Authority, or the Declaration, in International application No. PCT/US2012/027381 dated May 31, 2012 (13 pages).
PCT International Searching Authority, Notification Concerning Transmittal of the International Search Report and The Written Opinion of the International Searching Authority, or the Declaration, in International application No. PCT/US2012/027387 dated Jun. 6, 2012 (14 pages).
PCT International Searching Authority, Notification Concerning Transmittal of the International Search Report and The Written Opinion of the International Searching Authority, or the Declaration, in International application No. PCT/US2012/27378 dated Jun. 13, 2012 (14 pages).
PCT International Searching Authority, Notification Concerning Transmittal of the International Search Report and The Written Opinion of the International Searching Authority, or the Declaration, in International application No. PCT/US2012/027379 dated Jun. 20, 2012 (16 pages).
PCT International Searching Authority, Notification Concerning Transmittal of the International Search Report and The Written Opinion of the International Searching Authority, or the Declaration, in International application No. PCT/US2012/027384 dated Jun. 20, 2012 (10 pages).
Norair JP (2009). Introduction to DASH7 Technologies 1 st Edition. Whitepaper. Mar. 16, 2009. 1-22.
Richard MacManus. DASH7: Bringing Sensor Networking to Smartphones. readwrite.com. Apr. 11, 2010. pp. 1-5.

* cited by examiner

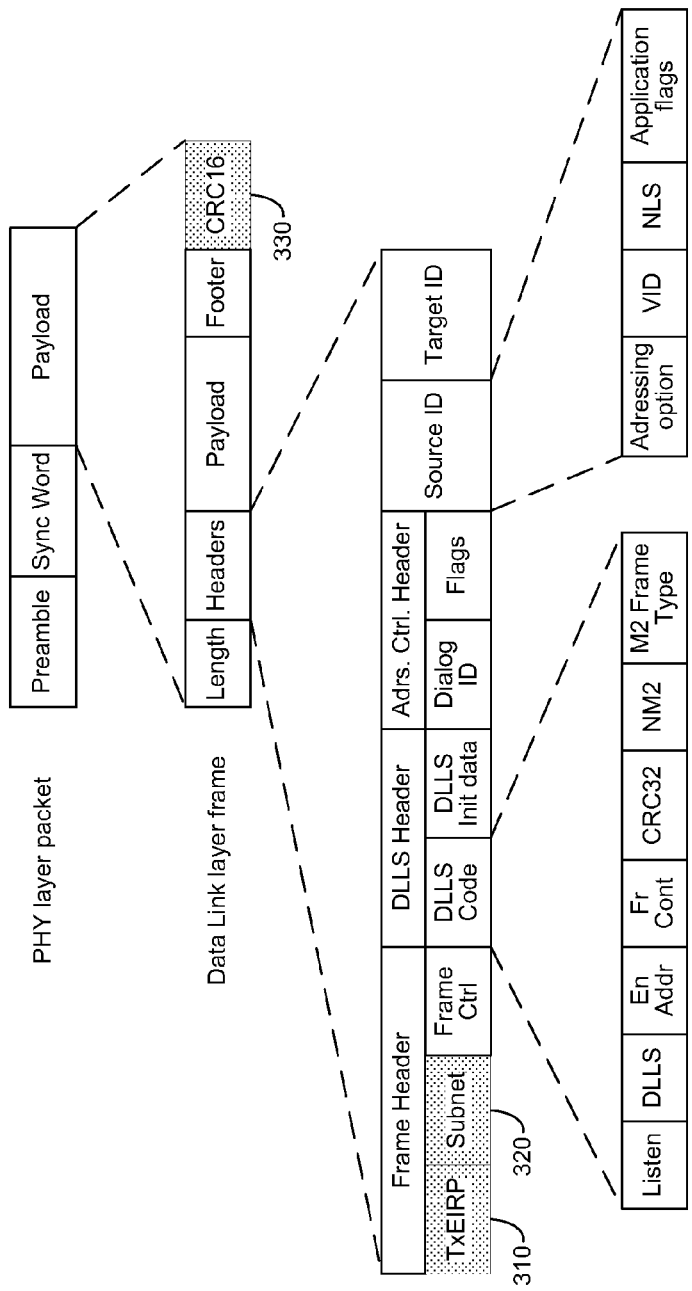
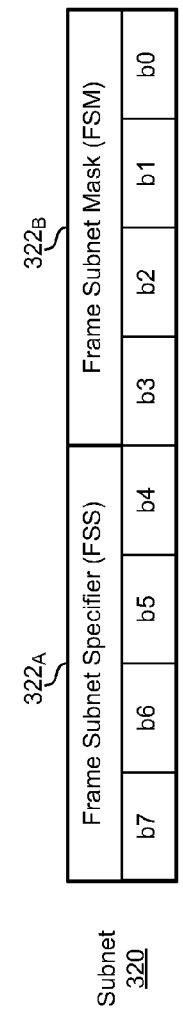
FIG. 3A
FIG. 3B

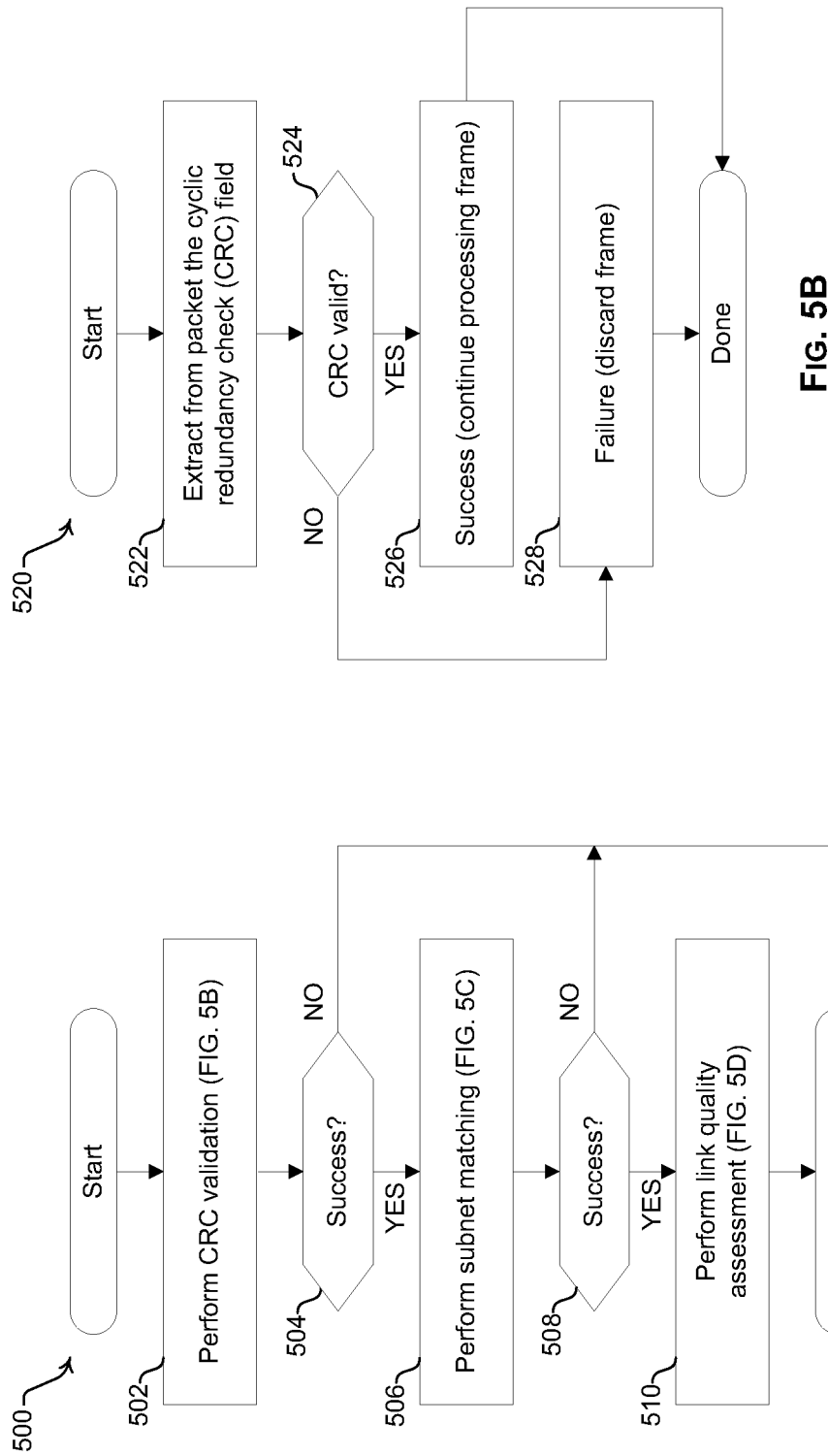

METHOD AND APPARATUS FOR ADAPTIVE TRAFFIC MANAGEMENT IN A RESOURCE-CONSTRAINED NETWORK

CLAIM OF PRIORITY

This patent application makes reference to, claims priority to and claims benefit from U.S. Provisional Application Ser. No. 61/464,376 which was filed on Mar. 2, 2011.

The above-referenced application is hereby incorporated herein by reference in its entirety.

CROSS-REFERENCE TO RELATED APPLICATIONS/INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. Provisional Patent Application Ser. No. 61/572,390 titled "System for Adding Dash7-Based Applications Capability to a Smartphone" and filed on Jul. 15, 2011;
U.S. patent application Ser. No. 13/267,640 titled "Method and Apparatus for Adaptive Searching of Distributed Datasets" and filed on Oct. 6, 2011 (now published as 2012/0087267);
U.S. patent application Ser. No. 13/267,621 titled "Method and Apparatus for Low-Power, Long-Range Networking" and filed on Oct. 6, 2011 (now published as 2012/0087350);
U.S. patent application Ser. No. 13/270,802 titled "Method and Apparatus for a Multi-band, Multi-mode Smartcard" and filed on Oct. 11, 2011 (now published as 2012/0088449);
U.S. patent application Ser. No. 13/270,959 titled "Method and Apparatus for an Integrated Antenna" and filed on Oct. 11, 2011 (now published as 2012/0086615);
U.S. patent application Ser. No. 13/289,054 titled "Method and Apparatus for Electronic Payment" and filed on Nov. 4, 2011 (now published as 2012/0116887);
U.S. patent application Ser. No. 13/289,050 filed on Nov. 4, 2011 (now published as 2012/0116694);
U.S. patent application Ser. No. 13/297,348 titled "Method and Apparatus for Interfacing with a Smartcard" and filed on Nov. 16, 2011 (now U.S. Pat. No. 8,622,312);
U.S. patent application Ser. No. 13/354,513 titled "Method and Apparatus for Memory Management" and filed on Jan. 20, 2012 (now published as 2012/0191901);
U.S. patent application Ser. No. 13/354,615 titled "Method and Apparatus for Discovering, People, Products, and/or Services via a Localized Wireless Network" and filed on Jan. 20, 2012 (now published as 2012/01918481);
U.S. patent application Ser. No. 13/396,708 titled "Method and apparatus for Plug and Play, Networkable ISO 18000-7 Connectivity" and filed on Feb. 15, 2012 (now published as 2012/0207141);
U.S. patent application Ser. No. 13/396,739 titled "Method and Apparatus for Serving Advertisements in a Low-Power Wireless Network" and filed on Feb. 15, 2012 (now published as 2012/0209716);
U.S. patent application Ser. No. 13/289,050 titled "Method and Apparatus for Forward Error Correction (FEC) in a Resource-Constrained Network" and filed on Feb. 29, 2012 (now published as 2012/0116694);
U.S. patent application Ser. No. 13/408,453 titled "Method and Apparatus for Dynamic Media Access Control in a Multiple Access System" and filed on Feb. 29, 2012 (now published as 2012/0224590);
U.S. patent application Ser. No. 13/408,457 titled "Method and Apparatus for Rapid Group Synchronization" and filed on Feb. 29, 2012 (now published as 2012/0224530);
U.S. patent application Ser. No. 13/408,461 titled "Method and Apparatus for Addressing in a Resource-Constrained Network" and filed on Feb. 29, 2012 (now published as 2012/0226822);
U.S. patent application Ser. No. 13/408,464 titled "Method and Apparatus for Query-Based Congestion Control" and filed on Feb. 29, 2012 (now published as 2012/0224543); and
U.S. patent application Ser. No. 13/408,466 titled "Method and Apparatus for Power Autoscaling in a Resource-Constrained Network" and filed on Feb. 29, 2012 (now published as 2012/0225687).

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and an apparatus for adaptive traffic management in a resource-constrained network.

BACKGROUND OF THE INVENTION

Existing methods of transmitting packets, and handling received packets result in inefficient use of resources and/or energy. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for adaptive traffic management in a resource-constrained network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is a block diagram illustrating exemplary structure of physical layer (PHY) packet carrying a data link layer frame, in accordance with an embodiment of the invention.

FIG. 3B is a block diagram illustrating exemplary structure of a subnet field in a data link layer frame, in accordance with an embodiment of the invention.

FIG. 5A is a flow chart that illustrates exemplary steps for performing a multi-stage filtering process during handling of received packets, in accordance with an embodiment of the invention.

FIG. 5B is a flow chart that illustrates exemplary steps for performing cyclic redundancy check (CRC) validation as one stage of a multi-stage filtering process during handling of received packets, in accordance with an embodiment of the invention.

DETAILED DESCRIPTION OF THE INVENTION

Figure 1:
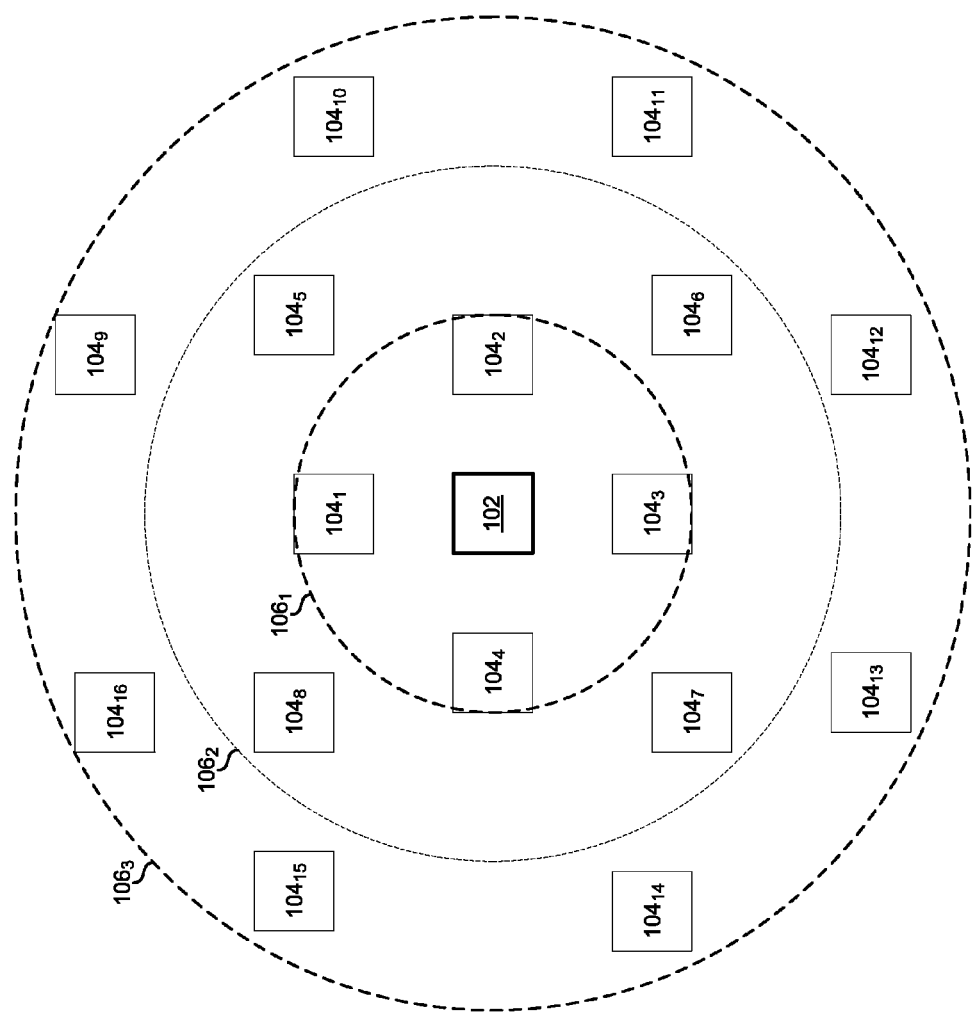
FIG. 1 is a block diagram illustrating an exemplary communication setup comprising a plurality of spatially-distributed, resource-constrained devices, which may be utilized in accordance with an embodiment of the invention.

Certain embodiments of the invention may be found in a method and apparatus for adaptive traffic management in a resource-constrained network. In various embodiments of the invention, an electronic device may apply multi-stage filtering to packets received by the electronic device. In this regard, the multi-stage filtering may comprise a validation and/or a check in each stage of the multi-stage filtering, whereby a failure of any validation or check of any stage when handling a packet terminates handling of the packet. Furthermore, at least one stage of the multi-stage filtering comprises a check that the packet is destined for the electronic device, and that check that the packet is destined for the electronic device may be determined based on subnet masking. In this regard, subnet masking based checks may comprise comparing subnet-related parameters embedded in the packet with subnet-related parameters in the electronic device. The multi-stage filtering may comprise applying in a first stage an error detection check to determine whether the packet was corrupted during communication over the physical medium. In this regard, the error detection check may comprise a validating the packet based on cyclic redundancy check (CRC) value associated with the packet. The multi-stage filtering may also comprise applying, in one of the stages, a check that communication of the packet meets predetermined energy criteria. In this regard, checking whether communication of the packet meets predetermined energy criteria may comprise validating that loss of energy associated with the communication is less than a preconfigured threshold. The loss of energy may be determined, for example, based on measurement of received signal strength indication (RSSI) and original transmit power for the packet, which may be obtained from information embedded in the packet.

In an embodiment of the invention, an electronic device may determine, after reception of a plurality of search responses from a plurality of other electronic devices, whether the number of search responses, which were triggered by a search request transmitted by the electronic device, exceeds a maximum response threshold. When the number of search responses exceeds the maximum response threshold, the electronic device may generate a modified search request to reduce number of expected search responses, and transmit the modified search request. In this regard, generating the modified search request may comprise adjusting transmit power used in transmitting the modified search request. The electronic device may also be operable to adjust query parameters during the generating of the modified search request such that query parameters embedded in the modified search request are different than query parameters embedded in the initial search request. In this regard, query parameters may comprise one or more of: compare length, compare code, compare mask, and compare value. The electronic device may also adjust subnet-related parameters during the generating of the modified search request such that subnet-related parameters of the modified search request are different than subnet-related parameters of the search request. In this regard, subnet-related parameters comprise a subnet specifier and/or a subnet mask. The electronic device may, in response to the search responses exceeding the maximum response threshold, and prior to transmission of the modified search request, transmit one or more frames to change the device subnet specifier stored in one or more of the plurality of other electronic devices.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$.

FIG. 1 is a block diagram illustrating an exemplary communication setup comprising a plurality of spatially-distributed, resource-constrained devices, which may be utilized in accordance with an embodiment of the invention. Referring to FIG. 1 there is shown a first device 102, second devices $104_1$-$104_{16}$, and perimeters $106_1$-$106_3$.

The first device 102 may comprise suitable logic, circuitry, interfaces, and/or code operable to transmit and receive wireless signals in accordance with one or more wireless protocols. Exemplary protocols which may be supported by the device 102 may include the ISO 18000-7 protocol, and protocols described in the above-incorporated U.S. Provisional Patent Application having Ser. No. 61/464,376 and filed on Mar. 2, 2011. The first device 102 may be less resource-constrained device. In this regard, the first device 102 may be, for example and without limitation, a laptop computer, a desktop computer, a tablet computer, a smart phone, a server, a set-top box, a gateway, a base station, a meter or code reader, or may comprise a combination of one or more such devices.

Each of the second devices $104_1$-$104_{16}$ may comprise suitable logic, circuitry, interfaces, and/or code operable to transmit and receive wireless signals in accordance with one or more wireless protocols, which may include the ISO 18000-7 standard, and protocols described in the above-incorporated U.S. Provisional Patent Application having Ser. No. 61/464,376 and filed on Mar. 2, 2011. Each of the second devices $104_1$-$104_{16}$ may be operable to store data (e.g., in the form of delimited strings of characters). At least some of the second devices $104_1$-$104_{16}$ may be more resource-constrained devices. In this regard, one or more of the second devices $104_1$-$104_{16}$ may have relatively little memory, relatively little processing energy, operate on battery energy, and/or may otherwise be constrained in terms of one or more resources. The second devices $104_1$-$104_{16}$ may comprise, for example, RFID tags, smartcards, keyfobs, cellphones, portable media players, appliances, and/or utility meters.

The second devices $104_1$-$104_{16}$ may be located at different distances relative to the first device 102. Accordingly, the perimeters $106_1$-$106_3$ may represent and/or delineate different zones of operations for the first device 102. Operating at each of the perimeters $106_1$-$106_3$ may correspond to, for example, utilization of different transmit power levels by device 102. That is, the device 102 may utilize a first transmit power $T_1$ to communicate with devices within the first perimeter $106_1$, utilize a second transmit power $T_2$ to communicate with devices within the second perimeter $106_2$, and utilize a third transmit power $T_3$ to communicate with devices within the third perimeter $106_3$, wherein $T_3 > T_2 > T_1$.

In operation, the device 102 may communicate one or more of the devices $104_1$-$104_{16}$. In this regard, communications among the devices 102 and $104_1$-$104_{16}$ may be based on the ISO 18000-7 protocol, and/or similar protocols such as the protocols described in the above-incorporated U.S. Provisional Patent Application having Ser. No. 61/464,376 and filed on Mar. 2, 2011. Use of such protocols may be preferred for low-power, long range communication, such as to enable RFID and like exchanges among the devices 102 and $104_1$-$104_{16}$. For example, at the 433 MHz band, low power communication based on such protocols may be in the range of 1-2000 m. Establishing communications among the devices 102 and $104_1$-$104_{16}$ may comprise utilizing a search mechanism to allow a device (e.g. device 102) to locate and establish connectivity with one or more other devices (e.g. one or more of devices $104_1$-$104_{16}$). Cross-referenced U.S. application Ser. No. 13/267,640, filed on Oct. 6, 2011, provides more details on implementing and/or using adaptive search among a plurality of devices, such as devices 102 and $104_1$-$104_{16}$. For example, the device 102 may initially search for particular one or more of the devices $104_1$-$104_{16}$. The search may be performed by locating devices having a particular string (e.g., a group of one or more ASCII or UNICODE characters). The device 102 may generate a search request packet and transmit the search request packet. If the search request packet is transmitted at energy $T_1$, the search request packet may be received by data-bearing devices $104_1$-$104_4$. If the search request packet is transmitted at energy $T_2$, the search request packet may be received by devices $104_1$-$104_8$. If the search request packet is transmitted at energy $T_3$, the search request packet may be received by devices $104_1$-$104_{16}$. Note that the above assumes signal propagation in the absence of interference or physical obstructions that critically impair communications between the device 102 and one or more of the devices $104_1$-$104_{16}$.

In various embodiments of the invention, the devices 102 and $104_1$-$104_{16}$ may be operable to support and/or utilize adaptive traffic management, to enhance energy and/or resource utilization in these devices. In this regard, such adaptive traffic management may incorporate use of intelligent and/or adaptive packet handling in the receiving devices, such as by use of efficient and/or optimized packet filtering, to enable identifying packets having particular characteristics promptly and efficiently, to facilitate discarding and/or terminating handling of these packets and doing so in a timely and efficient manner, thus preventing unnecessary use of energy or resources. In an embodiment of the invention, adaptive packet handling in the receiving devices may incorporate use of optimized packet filtering, which may comprise use of a multi-level filtering scheme. In this regard, such multi-level filtering may be utilized to enable determining when a packet (or frame carried therein) meets (or fails to meet) a plurality of corresponding conditions. These conditions may be determined by applying, at each level, a corresponding check or validation step. Some of the conditions incorporated into, and/or checked in the multi-level filtering scheme, may be adaptively set or configured to force discarding packets (or frames). To further enhance the filtering scheme, the various checks incorporated into the multi-level filtering scheme may be ordered within the multi-level scheme in a particular order that may achieve faster resolution. In other orders, the order of the filtering checks may be such in descending order based on likelihood of reaching a discarding determination—that is a first check may have the highest probability that a particular packet, the second check having lesser probability that the particular packet would be discarded, and so forth.

The adaptive traffic management may also incorporate use of intelligent and/or adaptive management of functions in the devices that may trigger communication and/or exchange of packets, to enable controlling communication of packets in a manner that optimizes energy consumption and/or resource utilization in the devices, and/or bandwidth or channel utilization in the network. For example, use of optimized search functions and/or policies by requesting devices may enable controlling and/or limiting the amount of responses, triggered by the search requests communicated by the requesting devices, in accordance with the constraints of the network and/or the capabilities—e.g., energy and/or resources—of the responding and/or the requesting devices. The search function may be optimized and/or enhanced by, for example, adjusting the search criteria to reduce the number of responding devices that would meet the search criteria and thus may communicate responses; and/or by adjusting (e.g., reducing) the transmit power used by the requesting device to control the search range, and thus the number of potential responding devices. Another adjustment may comprise modifying channel assignments in the network to prevent any particular channel(s) from being overloaded with response messaging while other channel(s) remain wholly or partially un-utilized—i.e., implement intelligent channel assignments to ensure balance load during search operations. These same mechanisms may also be utilized in increasing the search range and/or number of devices responding to search requests, such as when energy and/or resource availability in the network and/or devices improves to allow handling more responses.

Figure 2:
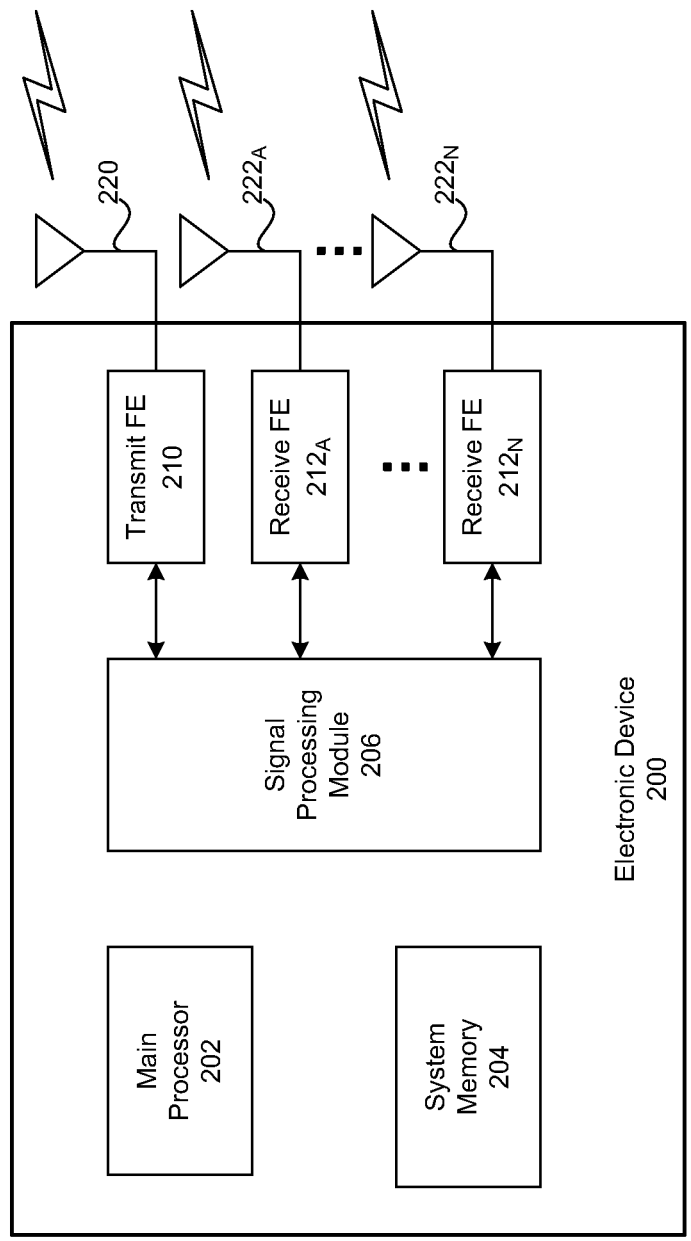
FIG. 2 is a block diagram illustrating an exemplary electronic device that may support optimized packet filtering, in accordance with an embodiment of the invention.

FIG. 2 is a block diagram illustrating an exemplary electronic device that may support optimized packet filtering, in accordance with an embodiment of the invention. Referring to FIG. 2 there is shown an electronic device 200.

The electronic device 200 may be similar to the electronic devices 102 and/or $104_x$ of FIG. 1, and may comprise suitable logic, circuitry, interfaces, and/or code that may be operable to implement various aspects of the invention. The electronic device 200 may comprise, for example, a host processor 202, a system memory 204, a signal processing module 206, a transmit front-end (FE) 210, a transmission antenna 220, a plurality of receive front-end (FE) $212_A$-$212_N$, and plurality of reception antennas $222_A$-$222_N$.

The host processor 202 may comprise suitable logic, circuitry, interfaces, and/or code that may be operable to process data, and/or control and/or manage operations of the electronic device 200, and/or tasks and/or applications performed therein. In this regard, the host processor 202 may be operable to configure and/or control operations of various components and/or subsystems of the electronic device 200, by utilizing, for example, one or more control signals. The host processor 202 may enable execution of applications, programs and/or code, which may be stored in the system memory 204, for example.

The system memory 204 may comprise suitable logic, circuitry, interfaces, and/or code that may enable permanent and/or non-permanent storage, buffering, and/or fetching of data, code and/or other information, which may be used, consumed, and/or processed in the electronic device 200. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The signal processing module 206 may comprise suitable logic, circuitry, interfaces, and/or code for enabling processing of signals transmitted and/or received by the electronic device 200. The signal processing module 206 may be operable to perform such signal processing operation as filtering, amplification, up-convert/down-convert baseband signals, analog-to-digital conversion and/or digital-to-analog conversion, encoding/decoding, encryption/decryption, and/or modulation/demodulation. The signal processing module 206 may be operable and/or configured to support low-power wireless protocol, such as ISO 18000-7, protocols described in above-incorporated U.S. Provisional Patent Application No. 61/464,376, and/or similar related protocols.

The transmit FE 210 may comprise suitable logic, circuitry, interfaces, and/or code that may be operable to perform wireless transmission, such as over a plurality of supported RF bands. The transmit FE 210 may enable, for example, performing wireless communications of RF signals via the transmission antenna 220. In this regard, the transmission antenna 220 may comprise suitable logic, circuitry, interfaces, and/or code that may enable transmission of wireless signals within certain bandwidths and/or based on certain protocols. For example, one or more of the transmission antenna 220 may enable transmission over the 433 MHz band, which may be suitable for ISM communication based on, for example, ISO 18000-7, protocols described in above-incorporated U.S. Provisional Patent Application No. 61/464,376, and/or similar related protocols.

Each of the plurality of receive FEs $212_A$-$212_N$ may comprise suitable logic, circuitry, interfaces, and/or code that may be operable to perform wireless reception, such as over a plurality of supported RF bands. Each of the plurality of receive FEs $212_A$-$212_N$ may enable, for example, performing wireless communications of RF signals via corresponding one of the plurality of reception antennas $222_A$-$222_N$. Each of the plurality of reception antennas $222_A$-$222_N$ may comprise suitable logic, circuitry, interfaces, and/or code that may enable reception of wireless signals within certain bandwidths and/or based on certain protocols. For example, one or more of the plurality of reception antennas $222_A$-$222_N$ may enable reception of signals communicated over different channels within the 433 MHz band, which may be suitable for ISM communication based on, for example, ISO 18000-7, protocols described in above-incorporated U.S. Provisional Patent Application No. 61/464,376, and/or similar related protocols.

In various embodiments of the invention, the electronic device 200 may support and/or implement adaptive traffic management, to enable optimizing energy consumption and/or resource utilization in the electronic device 200 during communications of signals. For example, the electronic device 200 may be operable to use optimized packet handling during reception of signals. In this regard, the electronic device 200 may be configured to implement and utilize a multi-stage packet filtering. The electronic device 200 may also be configured to apply adaptive and/or intelligent management of at least certain functions relating to transmission of signals. For example, in instances where the electronic device 200 may execute search operations, the electronic device 200 may be operable to use adaptive search function that may enable controlling the number and/or characteristics of expected responses in accordance with energy and/or resource constraints in the electronic device 200, and/or network limitations.

FIG. 3A is a block diagram illustrating exemplary structure of a physical layer (PHY) packet carrying a data link layer frame, in accordance with an embodiment of the invention. Referring to FIG. 3A, there is shown an exemplary physical layer (PHY) packet carrying a data link layer frame, which may be structured in accordance with wireless protocols utilized by electronic devices that implement various aspects of the invention. Cross-referenced U.S. application Ser. No. 13/408,453 filed on Feb. 29, 2012, and cross-referenced U.S. application Ser. No. 13/408,461 filed on Feb. 29, 2012 provide more details on the structures of exemplary PHY packets and/or data link layer frames.

The data link layer (DLL) frame carried in PHY packets may comprise a length field, indicating the length of the DLL frame, a header and a footer, providing information pertaining to the frame and/or handling thereof, and payload field. The DLL frame may also comprise a cyclic redundancy check (CRC) field 330. The header may comprise transmit equivalent isotropic radiated power (TxEIRP) field 310, which may indicate the original transmit power applied by the transmitting device in transmitting the packet (or frame). In other words, the TxEIRP field 310 embedded in the frame header provides the receiving device with information pertaining to the transmit power applied by the transmitting device, enabling the receiving device to precisely determine the original transmit power for received signals being handled by the receiving device.

The DLL frame may also comprise a subnet field 320. The subnet field 320 may be utilized in uniquely designating one or more devices as the target (receiving) device(s) for particular frame. Alternatively the subnet field 320 may be set to enable all devices reachable by a particular requesting device to accept and handle a particular frame. The subnet field is described in more details in FIG. 3B.

The cyclic redundancy check (CRC) field 330 may be used in conjunction with CRC operations. In this regard, CRC may provide a mechanism for performing error-detection in a network, enabling detection (and correction) of accidental and unintended changes to data communicated among devices in the network. The CRC operation may comprise determining particular check values for blocks of data, and then attaching these check values into the corresponding blocks (e.g. CRC field 330), at the transmitting side. The check values are then validated, at the receiving side, to detect any corruption or modification of the data in the blocks, and/or to try to correct that corruption. The CRC function determines the CRC check value for a block of data based on the remainder of a polynomial division of the content of the block. At the receiving end, a similar calculation may be performed, and corrective action may be taken when data corruption is detected, such as when the check values (attached to the block and determined locally) do not match. CRC functions are typically categorized based on the length of the polynomial used thereby. For example, the CRC scheme applied to DLL frames structured in accordance with the current invention may be based on a 16-bit CRC scheme (i.e., CRC16). The invention need not be so limited, however.

FIG. 3B is a block diagram illustrating exemplary structure of a subnet field in a data link layer frame, in accordance with an embodiment of the invention. Referring to FIG. 3B, there is shown the subnet field 320 of an exemplary data link layer frame, which may be structured in accordance with wireless protocols utilized by electronic devices that implement various aspects of the invention. Cross-referenced U.S. application Ser. No. 13/408,453 filed on Feb. 29, 2012, and cross-referenced U.S. application Ser. No. 13/408,461 filed on Feb. 29, 2012 provide more details on the structures of exemplary data link layer frames.

The subnet field 320 may be utilized to allow configurable, data-based filtering of incoming frames. The subnet field 320 may comprise two sub-fields, a frame subnet specifier $320_A$ and a frame subnet mask $320_B$. For example, the subnet field 320 may be structured as an 8-bit value, with the upper 4 bits containing the frame subnet specifier $320_A$ and the lower 4 bits containing the value of the frame subnet mask $320_B$. Values embedded into the two sub-fields of the subnet field 320 may be utilized by devices receiving data link layer frames to determine whether (or not) the frames are handled (or not) by the device. This process is described as "subnet matching." In this regard, each device may maintain corresponding internal subnet values (i.e., device subnet specifier and device subnet mask), which may be compared during subnet matching with the subnet field 320 embedded in received incoming frame. For example, during subnet matching the values of the subnet specifiers (the frame and the device) are compared, such as for exact match, unless the frame subnet specifier is set to a particular value (e.g., 0xF) that indicates a universal acceptance of the frame. The subnet masks (the frame and the device), which may comprise self-referential bitmasks, may be applied to mask other values used during subnet matching. Subnet matching is explained in more details with respect to subsequent figures.

Figure 3C:
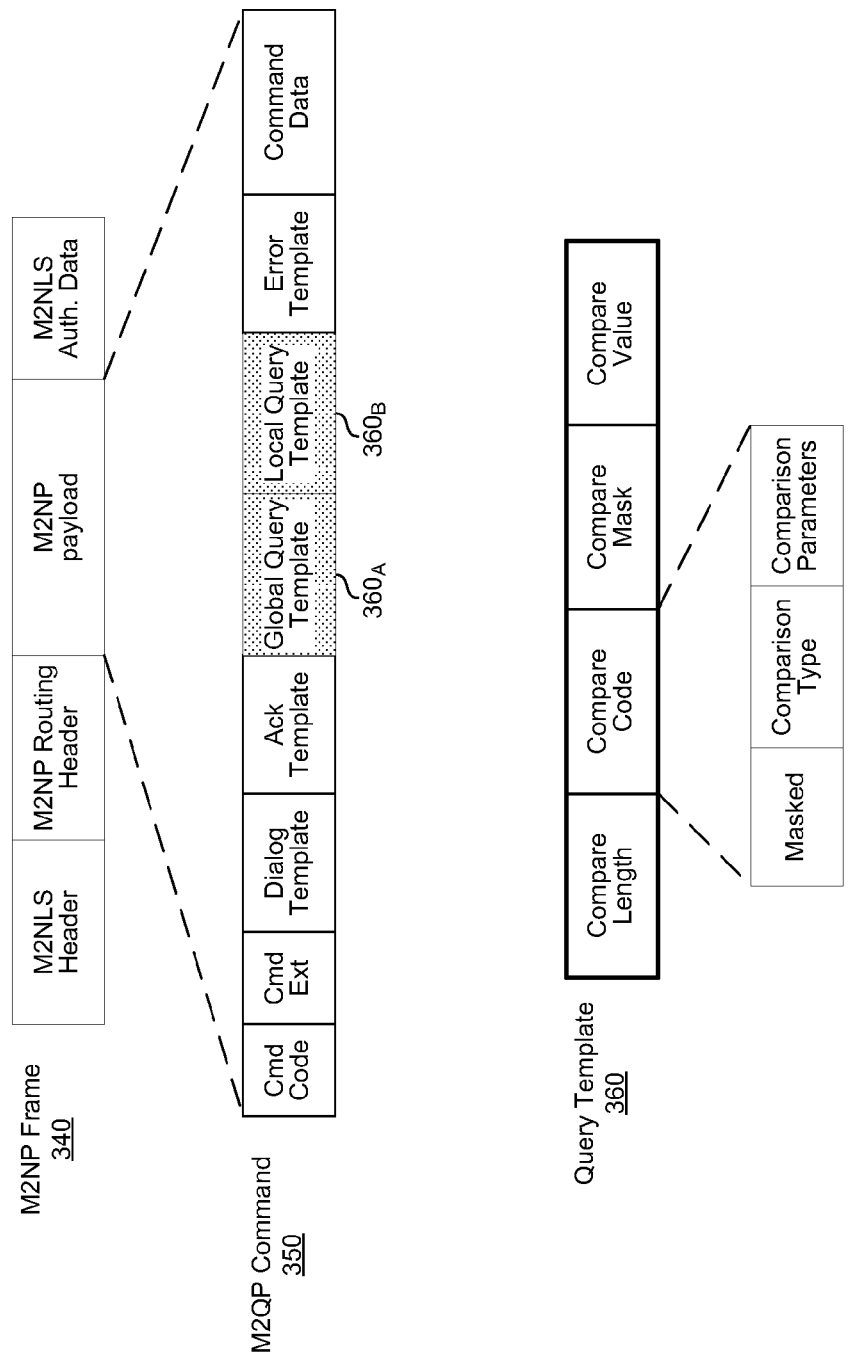
FIG. 3C is a block diagram illustrating exemplary structure of a data link frame utilized by a requester device in a resource-constrained network to specify response criteria, in accordance with an embodiment of the invention.

FIG. 3C is a block diagram illustrating exemplary structure of a data link frame utilized by a requester device in a resource-constrained network to specify response criteria, in accordance with an embodiment of the invention. Referring to FIG. 3B, there is shown an exemplary mode 2 network protocol (M2NP) PDU 340 carrying therein a mode 2 query protocol (M2QP) command 350, which may be structured in accordance with the present invention. Cross-referenced U.S. application Ser. No. 13/408,453 filed on Feb. 29, 2012, and cross-referenced U.S. application Ser. No. 13/408,461 filed on Feb. 29, 2012 provide more details on M2NP PDUs and/or the M2QP commands.

The M2QP command 350 may be utilized during search operations—that is a requesting device may communicate the M2QP command 350 to trigger search responses from certain devices receiving the command (i.e., responding devices) under particular conditions. The M2QP command 350 may comprise a global query template $360_A$ and a local query template $360_B$. Both of the global query template $360_A$ and the local query template $360_B$ are structured using the same generic query template 360. These fields may be utilized during search operations, to specify actions undertaken by receiving devices when determining whether the receiving devices should respond to received M2QP commands or to disregard the command (and thus not send back a response). In particular, the receiving devices may compare values embedded into the M2QP command 350 with corresponding values maintained locally by these devices, to determine whether (or not) to respond to the received M2QP command 350. Furthermore, various fields (and values stored therein) of the M2QP command 350 may specify various details and/or conditions pertaining to the comparisons being performed in determining whether (or not) to respond. Accordingly, configuring and/or modifying various fields or values embedded in the M2QP command 350, such as the global query template $360_A$ and the local query template $360_B$, may enable adjusting outcome of search functions.

In an embodiment of the invention, during adaptive traffic management operations, various fields of the M2QP command 350, such as is the global query template $360_A$ and the local query template $360_B$, may be modified to enable adjusting search functions being executed by a requesting device. For example, the number of receiving devices that may decide to respond to a received M2QP command 350 may be determined by adjusting comparison related values embedded in the global query template $360_A$ and the local query template $360_B$, such as: the comparison length (i.e., the length, in bits, of the portion of the embedded compare value being matched); the comparison mask (a bitmask for masking portion of embedded compare value being matched); the comparison value (the value being compared to a corresponding internal value in the devices); and/or the compare command, which may specify whether masking is used (or not), the type of comparison (e.g. logical 'or'), and any pertinent comparison parameters. For example, to reduce the number of devices that may qualify for responding to a particular M2QP command 350, masking may be turned off (that is the whole compare value must be matched), and/or the type of comparison specified by the compare command may be changed from logical 'or' to bitwise 'and.' This may enable a requesting device to reduce the number of responses being communicated in a resource-constrained network even when the transmit power of the requesting device (and this the search range) is kept unchanged.

Figure 4A:
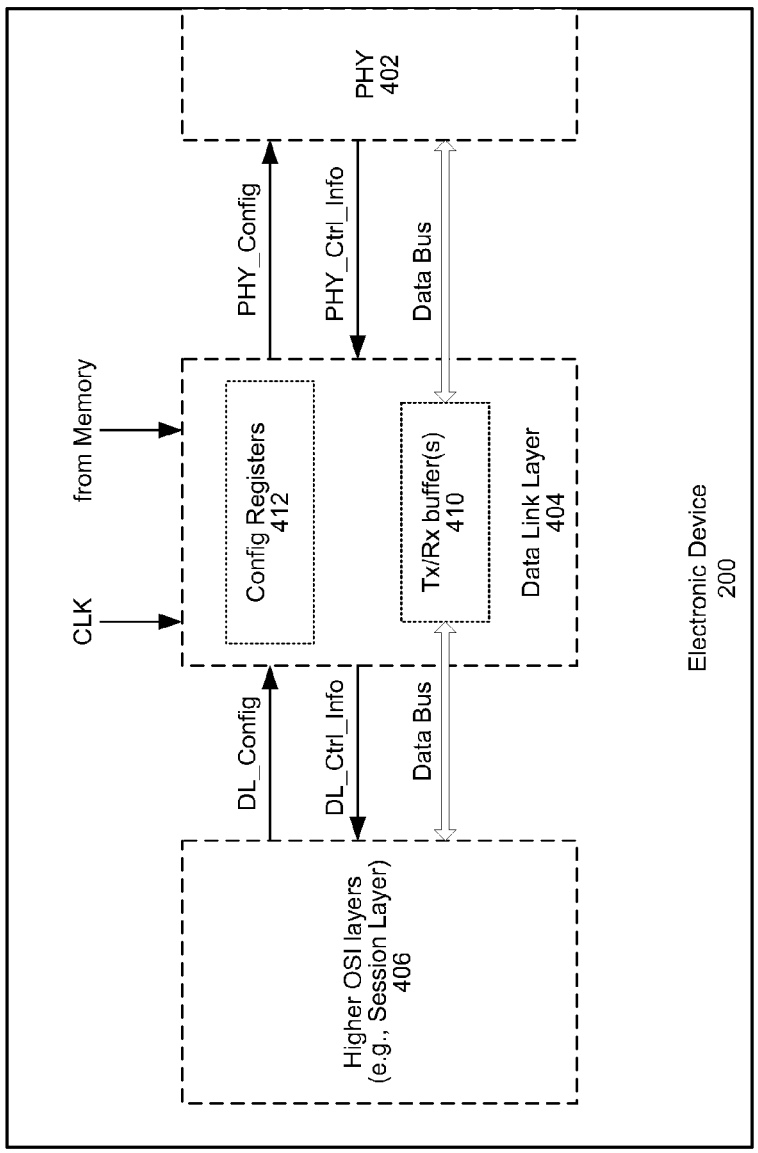
FIG. 4A is a block diagram illustrating an exemplary implementation of the OSI model within an electronic device that may support optimized packet filtering, in accordance with an embodiment of the invention.

FIG. 4A is a block diagram illustrating an exemplary implementation of the OSI model within an electronic device that may support optimized packet filtering, in accordance with an embodiment of the invention. Referring to FIG. 4A, there is shown the device 200 of FIG. 2.

The device 200 may be operable and/or configured to incorporate an OSI model based implementation in accordance with the protocol described in the above-incorporated U.S. Provisional Patent Application No. 61/464,476, filed on Mar. 2, 2011. In this regard, the 7 OSI layers may be implemented via one or more physical components of the device 200. For example, the Physical (PHY) Layer (layer 1 of the OSI model) may be implemented via the transmit FE 210 and the receive FE $212_A$-$212_N$; the Data Link Layer (layer 2 of the OSI model) and the Network Layer (layer 4 of the OSI model) may be implemented via the signal processing module 206; while the remaining layers, comprising the Transport Layer (layer 4 of the OSI model), the Session Layer (layer 5 of the OSI model), the Presentation Layer (layer 6 of the OSI model), and the Application Layer (layer 7 of the OSI model) may be implemented via the main processor 202.

During communications from and/or to the device 200, the seven OSI layers may be utilized to perform different functions and/or processes for facilitating such communications, and/or enable controlling various aspects related thereto. In this regard, the OSI module may typically be utilized to enable performing required header/footer encapsulation and/or stripping, and may comprise exchange of data among the OSI layers, after handling the data within each OSI layer—e.g., in accordance with particular protocol(s). For example, each OSI layer may attach to data received from higher OSI layer(s), headers/footers relating to that OSI layer, such as to enable a corresponding layer in a peer device to handle the data; and may strip such headers/footers from data received from lower OSI layer(s), typically after utilizing the headers/footers in handling data within that OSI layer, before forwarding the data to higher OSI layer(s). During OSI related processing, data may be internally exchanged among the OSI layers, and/or the physical components in which OSI layers are implemented, using data buses for example. The handling of data (e.g. encapsulation or stripping) may require buffering of data by one or more OSI layers, as demonstrated by use of transmit/receive (Tx/Rx) buffers 410 in the Data Link Layer 404.

To control operations of the OSI model, the OSI layers may need to exchange data enabling configuring and/or adjustment of functions and/or modules in the OSI layers. For example, the Physical Layer 402 may provide to the Data Link Layer 404 various information, shown as PHY_Ctrl_Info, which may in turn enable configuring and controlling the Physical Layer 402 (e.g., via PHY_Config) by the Data Link Layer 404 (and by higher layers operating via the Data Link Layer 404). The PHY_Ctrl_Info may comprise status information relating to the Physical Layer 402, and/or to various functions or modules thereof. The PHY_Ctrl_Info may also comprise information obtained via the Physical Layer 402.

Similarly, the Data Link Layer 404 may provide to the higher OSI layers 406 with various information, shown as DL_Ctrl_Info, which enable configuring and controlling the Data Link Layer 404 (e.g., via DL_Config) by the higher OSI layers 406. The DL_Ctrl_Info may comprise status information relating to the Data Link Layer 404 (and Physical Layer 402), and/or to various functions or modules thereof. The DL_Ctrl_Info may also comprise information obtained via the Data Link Layer 404. Dedicated configuration registers, such as configuration registers 412 of the Data Link Layer 404 may be utilized to store and maintain parameters used in effectuating requested configurations and/or adjustments.

Figure 4B:
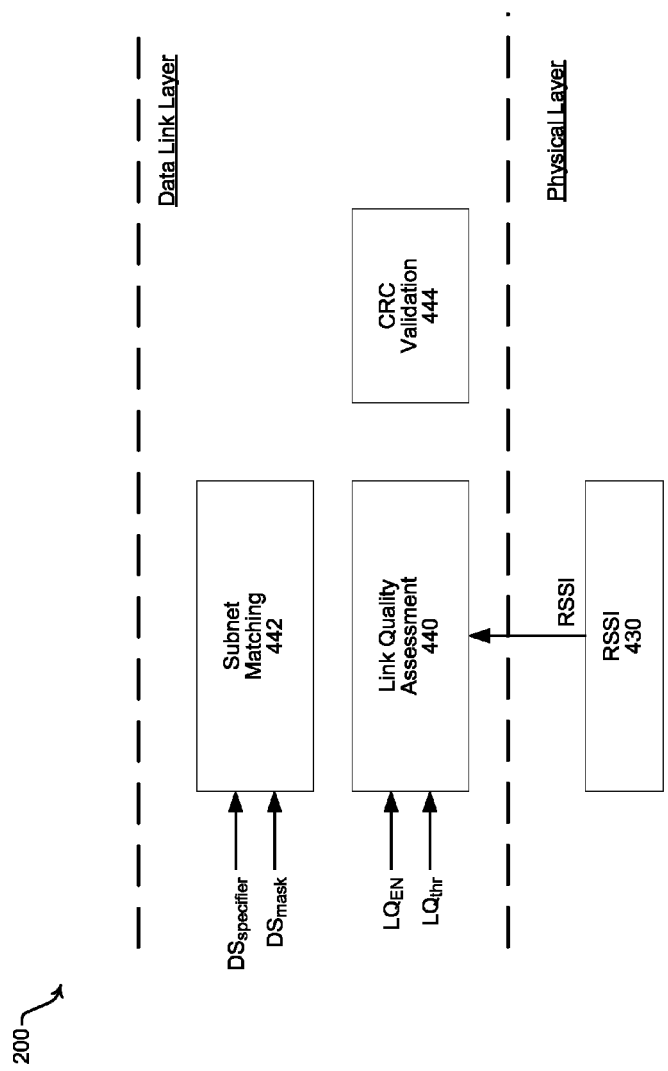
FIG. 4B is block diagram illustrating implementation of various aspect of the invention at different layers of the OSI model, in accordance with an embodiment of the invention.

In various embodiments of the invention, the OSI module implemented by the device 200 may be configured and/or adjust to enable and/or support adaptive traffic management. For example, the OSI model may be configured to support optimized packet handling. In this regard, implementing optimized packet handling in the OSI model may comprise adding new, dedicated functions and/or modules, and/or modifying or adjusting existing functions and/or modules performing operations that may affect transmission and/or reception of packets the device 200 during communications. For example, the OSI model may be modified and/or configured to implement a multi-stage packet filtering scheme in conjunction with reception of packets. FIG. 4B describes in more details an exemplary incorporation of optimized packet filtering into the OSI model.

FIG. 4B is block diagram illustrating implementation of various aspects of the invention at different layers of the OSI model, in accordance with an embodiment of the invention. As shown in FIG. 4B, the device 200 may comprise various modules and/or processes that may be run in different layers of the OSI model, and may interact to facilitate performing various functions and/or operations of the device 200.

For example, the device 200 may comprise a received signal strength indication (RSSI) module 430, which may operate at the Physical Layer (layer 1 of the OSI model); and a link quality assessment module 440, a subnet matching module 442, and a cyclic redundancy check (CRC) validation module 444, which may operate at the Data Link Layer (layer 2 of the OSI model).

The RSSI module 430 may implement RSSI measurement operations, in which the strength of received signals may be determined, and reported as a value corresponding to particular relative level between the minimum and maximum values.

The link quality assessment module 440 may implement link quality assessment, during which certain checks are performed to determine whether a received frame (extracted from received packet) may be discarded, or processing of the frame is continued. In this regard, during link quality assessment, the TxEIRP field is extracted from the frame's header, and the value of detected RSSI for the frame is subtracted from the TxEIRP field to derive a corresponding link budget utilization value. If link quality filtering is enabled (e.g., by assertion of $LQ_{EN}$), the frame would be discarded and Data Link Layer processing terminated when the derived link budget utilization value is greater than a particular link quality threshold (shown as $LQ_{thr}$). The $LQ_{thr}$ may be configurable, in a manner that enables determining whether a particular frame is discarded based on determination of loss of power during communication of the frame. In this regard, setting $LQ_{thr}$ to a relatively-high value may reduce power consumption because: the device may process fewer received packets (because they are dropped rather than being processed), the device may transmit fewer packets (because there are fewer successfully-received packets to respond to), and/or the average transmit power is lower (because responses are only being sent from devices which are reachable via a short/low-attenuation path). The value of $LQ_{thr}$ may be configured based, for example, on one or more of: location of the device (e.g., determined by GPS and/or other wireless signals), type of device (e.g., whether the device is a laptop, a smartphone, or a battery-powered tag), power source of the device (e.g., plugged-in or running on battery), remaining battery charge, which particular and/or types of the devices are desired to be communicated with, and results of past communications (e.g., number of responses received to previous requests).

The subnet matching module 442 may implement subnet matching, during which certain checks are performed to determine whether a received frame (extracted from received packet) may be discarded, or whether processing of the frame is to be continued. In this regard, during subnet matching, certain subnet-related values embedded in received frames may be compared to corresponding subnet-related values maintained internally in the electronic device (shown as $DS_{specifier}$ and $DS_{mask}$). For example, each frame may comprise a frame subnet specifier, which must match a corresponding internally maintained device frame subnet specifier ($DS_{specifier}$) for a successful subnet matching to occur—alternatively, successful subnet matching may result when the frame subnet specifier is a universal acceptance value. Other subnet related values may comprise subnet masks (both frame and device—that is $DS_{mask}$) and these masks may comprise bitmasks. In this regard, during subnet matching, device and frame subnet masks may be logically 'anded,' and compared when determining whether subnet matching was successful. Subnet matching is described in more details in FIG. 5C.

In an exemplary embodiment, the $DS_{mask}$ values of devices having a particular $DS_{specifier}$ may be normally distributed between 0 and 15. That is, approximately $1/16^{th}$ of the devices may have a $DS_{mask}$ value of 0, $1/16^{th}$ of the devices may have a value of 1, and so on. Accordingly, controlling the value of the FSM may enable controlling the number of devices which respond to a particular request. For example, an FSM of 1111 may result in all devices responding, an FSM of 0111 may result in half of the devices responding, an FSM of 0011 may result in ¼ of the devices responding, and an FSM of 0001 may result in $\frac{1}{8}^{th}$ of the devices responding, and FSM of 0000 may result in $\frac{1}{16}^{th}$ of the devices responding.

The CRC validation module 444 may implement data integrity checking, during which certain checks are performed to determine whether a received frame (extracted from received packet) may be discarded, or processing of the frame is continued. In this regard, during CRC validation, the CRC value embedded (or attached) to particular frame is compared to locally determined CRC value based on content of the frame. For example, when 16-bit CRC (CRC16) is utilized, when the CRC16 calculation of the content of a received frame matches the CRC16 value (field 330) attached to the frame, processing of the frame (by the Data Link Layer) may continue. In an embodiment of the invention, the CRC16 calculation applicable via the CRC validation module 444 may include all previous bytes of the frame, and it may utilize the International Telegraph and Telephone Consultative Committee (CCITT) CRC 16 polynomial, or $X^{16}+x^{12}+X^5+x^0$ (1021) with initial value 0xFFFF.

In operation, the link quality assessment module 440, the subnet matching module 442, and the CRC validation module 444 may be utilized to enable performing multi-stage filtering of received packets in the device 200. For example, the CRC validation module 444 may be utilized to perform a first filtering stage, in which CRC validation is applied, with the frame being discarded if CRC validation fails, and handling of the frame continuing if the CRC validation succeeds. The link quality assessment module 440 may be utilized to perform a second filtering stage, in which link quality assessment is applied, with the frame being discarded if link quality assessment fails, and handling of the frame continuing if the link quality assessment succeeds. The subnet matching module 442 may be utilized to perform a third filtering stage, in which subnet matching is applied, with the frame being discarded if subnet matching fails, and handling of the frame continuing if the subnet matching succeeds.

The order of functions applicable in the different stages of the multi-stage filtering scheme may be configurable. In this regard, the selective matching of particular validation functions with the various stages of the filtering scheme may be done in a manner that best optimize the handling of the packet. In other words, the assignment of the various checks and/or validation functions performed during the multi-stage filtering may be determined based on probability of failure, with checks more likely to fail (i.e., conditions more like to be met) being performed earlier, and check less like to fail being done subsequently. Furthermore, the ordering of the checks and/or validation steps may also depend on evaluation of the relevance of these checks or validations. For example, checks or validations relating to the integrity of the received fames and/or data carried therein may be performed earlier, since any errors in the content may result in false outcomes in remaining checks. For example, because the outcome of the subnet matching or link quality assessment may be false when the content of frames is corrupted (altering fields or values used during these checks), the first stage of the multi-stage filtering may be tailored to validate the reliability of the frames, such as by applying the CRC validation as a first stage since it ensures that the content of the frames, which may comprise values used by the other checks (e.g., TxEIRP 310 and frame subnet 320) are trustworthy.

FIG. 5A is a flow chart that illustrates exemplary steps for supporting optimized packet filtering in an electronic device, in accordance with an embodiment of the invention. Referring to FIG. 5A, there is shown a flow chart 500 comprising a plurality of exemplary steps for performing multi-stage packet filtering in an electronic device, such as device 200, during reception of packet by the electronic device in a resource-constrained network.

In step 502, after a start step, CRC validation may be performed (FIG. 5B) on a particular frame carried via a received packet. In step 504, a determination whether the CRC validation was successful may be performed. In instances where the outcome of the CRC validation is not successful, the plurality of exemplary steps may terminate, with the frame being discarded, and/or handling or processing of the frame being terminated—that is, any resources, functions and/or modules being allocated and/or spawned for handling of the frame being released and/or terminated.

Retuning to step 504, in instances where the outcome of the CRC validation is successful, the plurality of exemplary steps may proceed to step 506. In step 506, subnet matching may be performed (FIG. 5C) on the frame. In step 508, a determination whether the subnet matching was successful may be performed. In instances where the outcome of the subnet matching is not successful, the plurality of exemplary steps may terminate, with the frame being discarded and/or handling or processing of the frame being terminated.

Retuning to step 508, in instances where the outcome of the subnet matching is successful, the plurality of exemplary steps may proceed to step 510. In step 510, link quality assessment may be performed (FIG. 5D) on the frame.

FIG. 5B is a flow chart that illustrates exemplary steps for performing cyclic redundancy check (CRC) validation as one stage of a multi-stage filtering process during handling of received packets, in accordance with an embodiment of the invention. Referring to FIG. 5B, there is shown a flow chart 520 comprising a plurality of exemplary steps for performing CRC validation as part of a multi-stage packet filtering scheme in an electronic device, such as device 200.

In step 522, after a start step, the CRC value (e.g. field 330) attached to a frame carried in a received packet may be extracted. In step 524, CRC validation may be performed using the extracted CRC value, and locally calculated CRC value based on the content of the frame. In instances where the CRC validation is successful (i.e. the CRC is valid), the plurality of exemplary steps may proceed to step 526, where the processing and handling of the frame may continue (i.e., a successful check).

Returning to step 524, in instances where the CRC validation fails (i.e. the CRC is not valid), the plurality of exemplary steps may proceed to step 528, where the frame may be discarded, and processing and handling of the frame may be terminated (i.e., failed check).

Figure 5C:
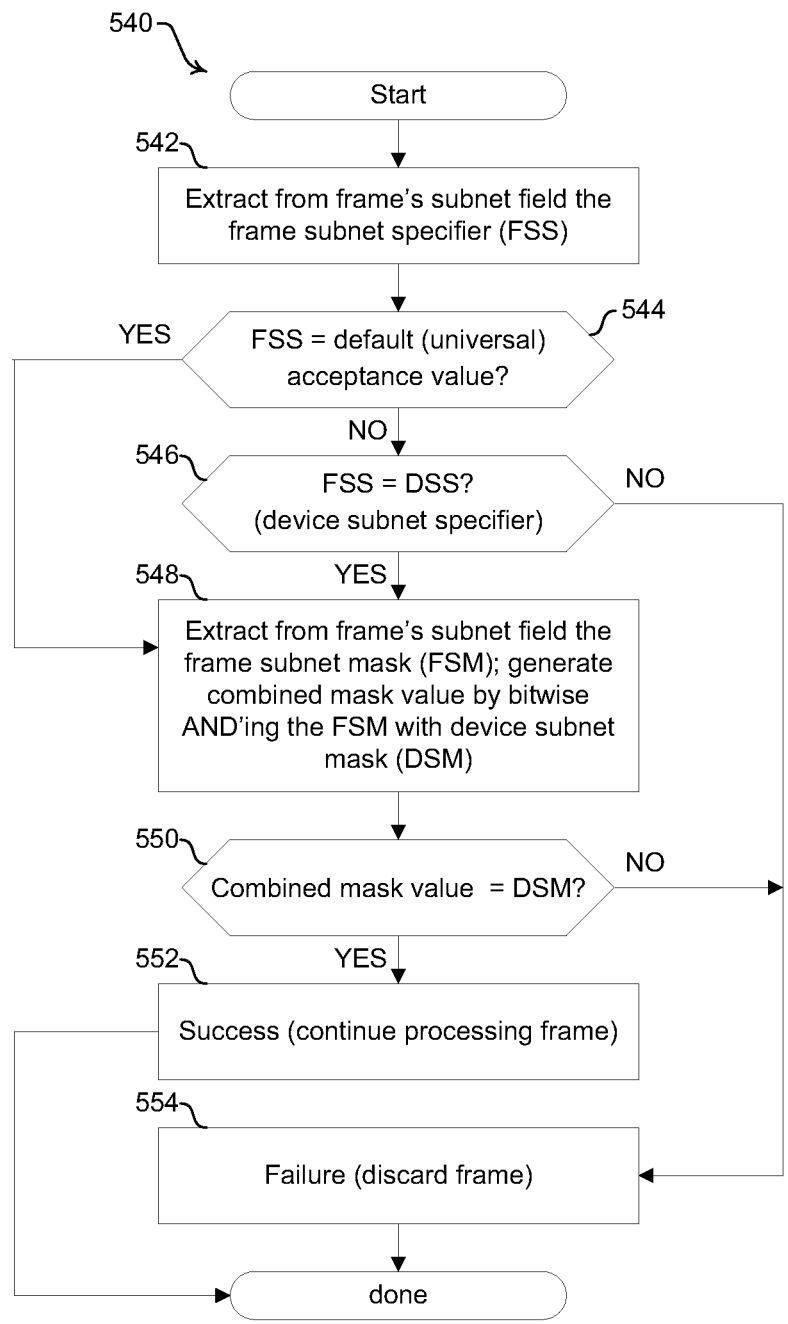
FIG. 5C is a flow chart that illustrates exemplary steps for performing subnet matching as one stage of a multi-stage filtering process during handling of received packets, in accordance with an embodiment of the invention.

FIG. 5C is a flow chart that illustrates exemplary steps for performing subnet matching as one stage of a multi-stage filtering process during handling of received packets, in accordance with an embodiment of the invention. Referring to FIG. 5C, there is shown a flow chart 540 comprising a plurality of exemplary steps for performing subnet matching as part of a multi-stage packet filtering scheme in an electronic device, such as device 200.

In step 542, the frame subnet specifier (FSS)—i.e., the value of subfield $320_A$—may be extracted from the frame's subnet field 320. In step 544, a determination of whether the frame subnet specifier (FSS) is the universal acceptance value may be performed. In this regard, a particular value (e.g., 0xF) may be reserved for use as a default value that triggers bypassing the specifier matching during subnet matching in receiving devices. In instances, where the frame subnet specifier (FSS) is the universal acceptance value, the process may jump to step 548.

Returning to step 544, in instances, where the frame subnet specifier (FSS) is NOT the universal acceptance value, the process may proceed to step 546. In step 546, a comparison between the frame subnet specifier (FSS) and a corresponding, locally maintained (in the device) subnet specifier (DSS) may be performed. In other words, the frame subnet specifier (FSS) is compared against the DSS. In this regard, the comparison may be directed to determining if the two values match. The matching may be, but not limited to, exact matching. In instances where the frame subnet specifier (FSS) does not match the device subnet specifier (DSS), the plurality of exemplary steps may proceed to step 554, where the frame may be discarded, and processing and handling of the frame may be terminated—that is, any resources, functions and/or modules being allocated and/or spawned for handling of the frame being released and/or terminated.

Returning to step 546, in instances where the frame subnet specifier (FSS) matches the device subnet specifier (DSS), the plurality of exemplary steps may proceed to step 548. In step 548, the frame subnet mask (FSM)—i.e., the value of subfield 320$_B$—may be extracted from the frame's subnet field 320; and a combined mask value may be generated from the frame subnet mask (FSM) and the corresponding, internally maintained (in the device) subnet mask (DSM). In this regard, the combined mask value may be generated by bitwise 'anding' the frame subnet mask (FSM) with device subnet mask (DSM). In step 550, a comparison between the combined mask value and the device subnet mask (DSM) may be performed. In other words, the combined mask value (generated by bitwise anding of FSM and DSM) is compared against a DSM. In this regard, the comparison may be directed to determining if the two values match. The matching may be, but not limited to, exact matching. In instances where the combined mask value does not match the device subnet mask (DSM), the plurality of exemplary steps may proceed to step 554, where the frame may be discarded, and processing and handling of the frame may be terminated (i.e. failure).

Returning to step 550, in instances where the combined mask value matches the device subnet mask (DSM), the plurality of exemplary steps may proceed to step 552, where processing and handling of the frame may continue (i.e. success).

Figure 5D:
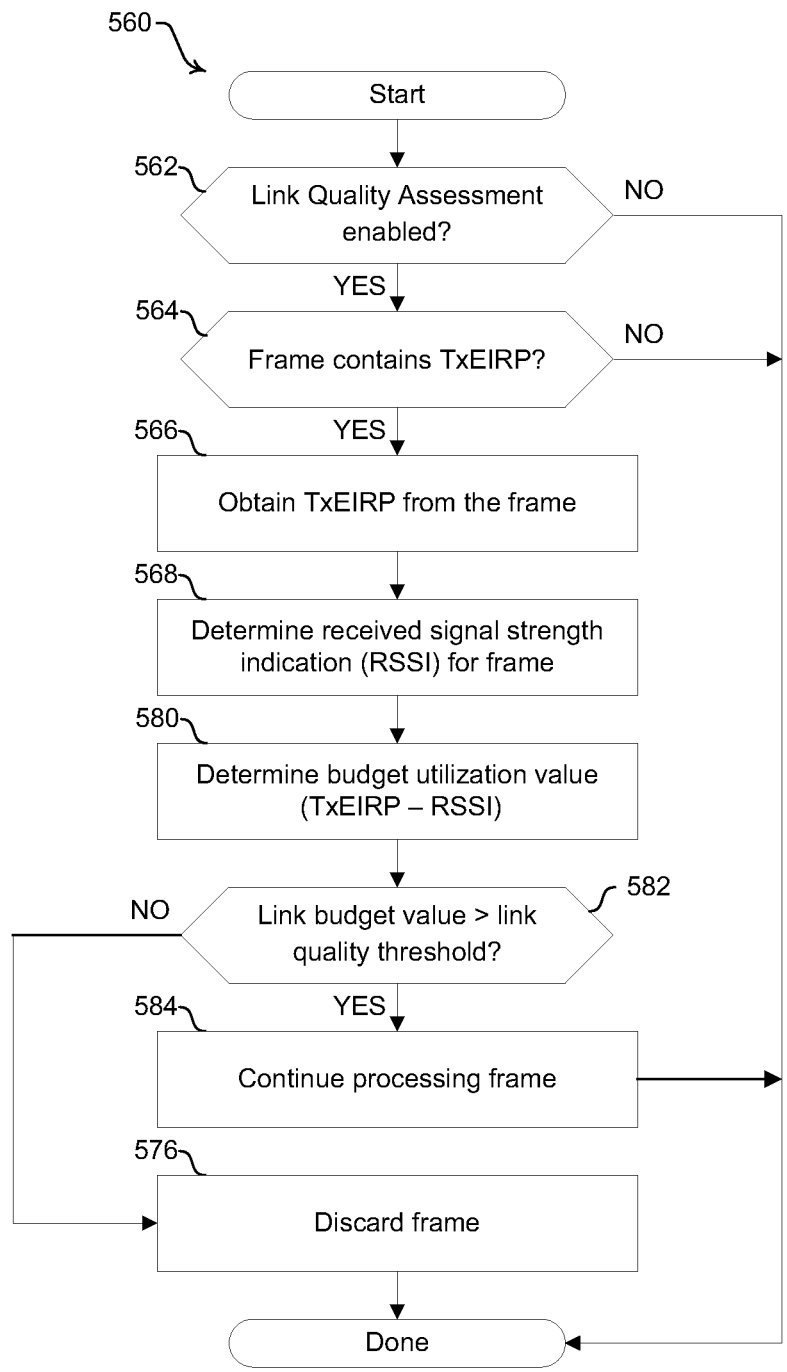
FIG. 5D is a flow chart that illustrates exemplary steps for performing link quality assessment as one stage of a multi-stage filtering process during handling of received packets, in accordance with an embodiment of the invention.

FIG. 5D is a flow chart that illustrates exemplary steps for performing link quality assessment as one stage of a multi-stage filtering process during handling of received packets, in accordance with an embodiment of the invention. Referring to FIG. 5D, there is shown a flow chart 560 comprising a plurality of exemplary steps for performing link quality assessment as part of a multi-stage packet filtering scheme in an electronic device, such as device 200.

In step 562, after start of process, a determination whether link quality assessment is enabled may be performed. In this regard, link quality assessment may be enabled (or disabled) by asserting (or de-asserting) a control signal or control parameters (e.g. in register), such as $LQ_{EN}$, which may in turn activate corresponding function or module (e.g. link quality assessment module 340) for performing and/or managing power autoscaling operations. In instances where it may be determined that link quality assessment is not enabled the process may terminate.

Returning to step 562, in instances where it may be determined that link quality assessment is enabled the process may proceed to step 564. In step 564, a determination whether a received (data link) frame comprises a TxEIRP field may be performed. In this regard, the TxEIRP field may indicate the equivalent isotropic radiated power (EIRP)—i.e., power—that the transmitting device originally utilized in transmitting the packet (or frame) which is being handled by the receiving device. In instances where it may be determined that the received frame does not comprise the TxEIRP field the process may terminate.

Returning to step 564, in instances where it may be determined that the received frame comprises the TxEIRP field the process may proceed to step 566. In step 566, the TxEIRP field (or value thereof) may be extracted. In step 568, the received signal strength indication (RSSI) may be determined. In this regard, the RSSI may measure the strength of the signal(s) carrying the packet that comprise the frame in question, as determined by the receiving device. In step 570, the link budget utilization value may be determined, by subtracting the measured RSSI value from the extracted TxEIRP. In other words, the link budget utilization value may correspond to the loss of power during communication of the signals carrying the packet (frame) between the transmitting device and the receiving device. In step 572, it may be determined whether the calculated link budget utilization value is greater than a particular link quality threshold. In this regard, the link quality threshold $LQ_{thr}$ may be configurable value. Specifically, the $LQ_{thr}$ parameter may be set and/or adjusted during adaptive power autoscaling, to enable modifying signal reception sensitivity in the device 200. The value of the $LQ_{thr}$ threshold, and/or any adjustment thereof, may be dictated by the applicable power autoscaling algorithm. In instances where it may be determined that the link budget utilization value is greater than the link quality threshold ($LQ_{thr}$), the process may proceed to step 574, enabling handling and/or processing of the frame to continue. Returning to 572, in instances where it may be determined that the link budget utilization value is not greater than the link quality threshold ($LQ_{thr}$), the process may proceed to step 576, where handling and/or processing of the frame may be stopped and the frame may be discard.

Figure 6:
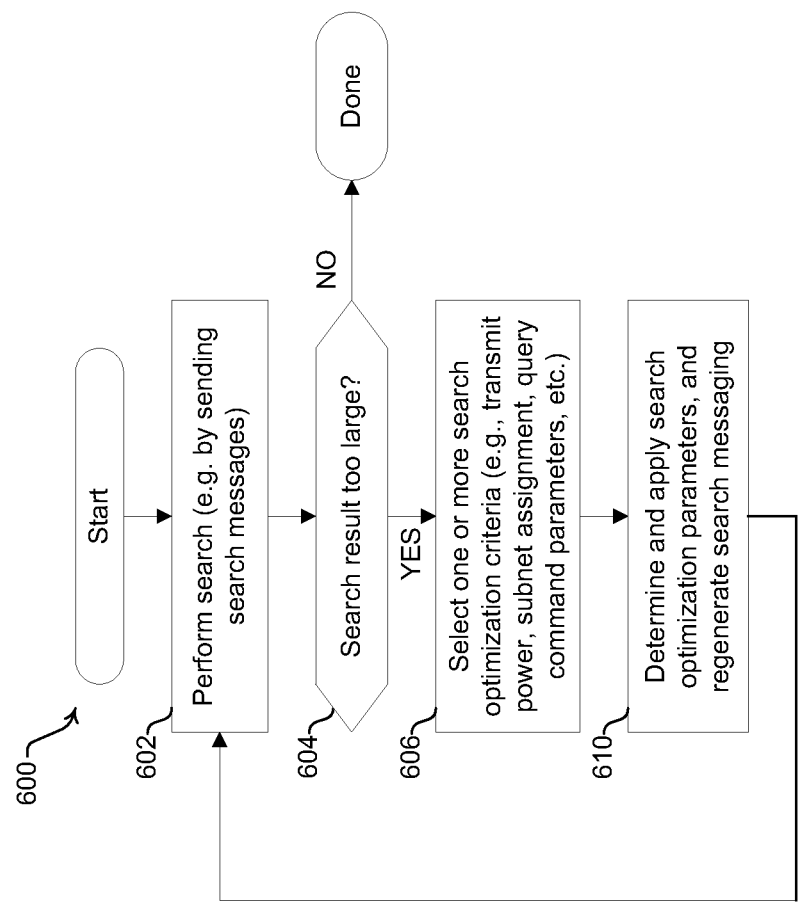
FIG. 6 is a flow chart that illustrates exemplary steps for adjusting transmission criteria by a requester device to optimize traffic in a resource-constrained network, in accordance with an embodiment of the invention.

In an embodiment of the invention, parameters utilized in applying and/or controlling link quality assessment may be set and/or modified in accordance with applicable filtering scheme used in the device 200, to adjust filtering outcome of this process. Adjusting the $LQ_{thr}$ threshold, for example, may cause a corresponding adjustment in the determination whether to discard a packet or to continue processing it. In this regard, when the $LQ_{thr}$ threshold is set to a low value, received signals communicated over links having high link budget value (i.e. large power loss) may be perceived (the signal) as being sufficiently reliable, and packets/frames carried via such signal may be processed; whereas when the $LQ_{thr}$ threshold is set to a high value, received signals communicated over links having low link budget value (i.e. small power loss) may perceived as not being sufficiently reliable, and packets/frames carried via such signals are discarded. The value of the $LQ_{thr}$ threshold may be adjusted in accordance with applicable multi-stage filtering scheme. In this regard, adjusting the $LQ_{thr}$ threshold may enable modifying reception sensitivity—that is setting the $LQ_{thr}$ threshold to a low value would enable handling and/or processing packets/framed carried via signal communicated over a link having a particular link budget value (power loss) whereas packets/frames, carried via similar signals communicated over link with similar link budget value would be discarded when the $LQ_{thr}$ threshold is increased FIG. 6 is a flow chart that illustrates exemplary steps for adjusting transmission criteria by a requester device to optimize traffic in a resource-constrained network, in accordance with an embodiment of the invention. Referring to FIG. 6, there is shown a flow chart 600 comprising a plurality of exemplary steps that may be performed by an electronic device, such as device 200, to provide enhanced search in a resource-constrained network.

In step 602, a requesting device may initiate a search operation. In this regard, the search operation may comprise transmitting one or more search commands, such as the M2QP command 350 of FIG. 3C, whereby devices receiving this command (the receiving devices) may determine whether (or not) to respond to the search command. Determining whether or not to respond to search commands may be based on compare functions executed in the receiving devices, based on information embedded in the search command and/or information maintained locally. These values may comprise both values that are being compared and/or parameters specifying details and/or conditions applicable to the compare functions. In step 604, a determination whether the number of received search responses exceeds a maximum response threshold may be performed. In other words, the requesting device may determine whether the search operation performed in step 602 resulted in a large number of responses that may be undesirable in light of the network and/or device constraints—that is whether the search triggers a number of responses that is deemed too large to be handled, due to bandwidth utilization in the network (or particular channels), and/or energy consumption or resource utilization in conjunction with handling the responses. The value of the maximum response threshold may be configurable, and it may be modified based on changing conditions in the network and/or the requesting devices (e.g., freeing up of bandwidth in the network, drainage in energy supply of the requesting device, execution of other functions with lower/higher priority, etc.). The maximum response threshold may be determined implicitly, such as based on detecting of too many data collisions (e.g., too many bad CRC); or explicitly, such as if the response window is sufficiently crowded. In instances where it may be determined that the number of responses exceeded the maximum response threshold, the process may terminate.

Returning to step 604, in instances where it may be determined that the number of responses did exceed the maximum response threshold; the process may proceed to step 606. In step 606, the requesting device may select one or more search optimization criteria for modifying the search function. For example, the search optimization may comprise adjustment of transmit power, such as by reducing transmit power to physically narrow the search range. Additionally or alternatively, the search optimization may comprise adjustments that logically narrow the search range—i.e. reduce the number of devices that would meet the conditions required for responding to the search. Such logical narrowing of the search may be achieved by modifying the search command itself (e.g., by adjusting the query template parameters). The logical narrowing of the search may be achieved by modifying the classification and/or assignment of devices and/or channels in the network. For example, subnet assignments may be adjusted such that smaller number of devices would successfully pass subnet matching applicable based on the search command (e.g., the requesting device may send a multicast frame which results in a new DSS being written to some of the responding devices). Additionally or alternatively, some receiving device(s) may be reassigned to and/or instructed to respond on a different channel than the one(s) on which the search command is transmitted or specified as acceptable response channel(s). Similarly, different subsets of responding devices may be instructed to respond on different channels and/or at different times. In step 608, the search optimization criteria selected in step 606 are applied, and the search operation is re-executed with a new search command being generated, in accordance with the modified criteria, and transmitted.

While the process described in FIG. 6 is based on checking for the condition that the number of received search responses exceeds a maximum response threshold, the invention need not be so limited. For example, in an embodiment of the invention, a check of whether the number of received search responses reaches a minimum response threshold may also be performed, and the search function may be adjusted to increase the range of search, both physically (e.g., by increasing the transmit power) and/or logically, such as by increasing the number of devices that would meet the conditions required for responding to the search, by adjusting the query template parameters and/or subnet related parameters for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for adaptive traffic management in a resource-constrained network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A system, comprising:
circuitry of an electronic device that comprises a processor and a communication interface for communication over a physical medium, said circuitry being operable to:

determine, after reception of a plurality of search responses from a plurality of other electronic devices, whether the number of said search responses exceeds a maximum response threshold, wherein:

the search responses are triggered by a first search request transmitted by said electronic device; and said first search request comprises a first compare command that indicates a comparison type that a receiver of said search request is to use for generation of a decision as to whether to transmit a reply to said first search request;

when the number of search responses exceeds said maximum response threshold, generate a modified search request to reduce number of expected search responses; and transmit, via said communication interface, said modified search request, wherein said modified search request comprises a second compare command that indicates a comparison type that a receiver of said search request is to use for generation of a decision as to whether to transmit a reply to said modified search request.

2. The system of claim 1, wherein said generation of said modified search request comprises an adjustment of transmit power used for transmission of said modified search request.

3. The system of claim 1, wherein said circuitry is operable to adjust query parameters during said generation of said modified search request such that query parameters embedded in said modified search request are different than query parameters embedded in said first search request.

4. The system of claim 1, wherein each of said first comparison type and said second comparison type is one of a logical OR comparison type, and a bitwise AND comparison type.

5. The system of claim 1, wherein said circuitry is operable to adjust subnet-related parameters during said generation of said modified search request such that subnet-related parameters of said modified search request are different than subnet-related parameters of said first search request.

6. The system of claim 5, wherein said subnet-related parameters comprise a subnet specifier and/or a subnet mask.

7. A system comprising, an electronic device that comprises a communication interface for communication over a physical medium, said electronic device being operable to:

determine, after reception of a plurality of search responses from a plurality of other electronic devices, whether the number of said search responses exceeds a maximum response threshold, wherein the search responses are triggered by a first search request transmitted by said electronic device;

when the number of said search responses exceeds said maximum response threshold, generate a modified search request to reduce number of expected search responses;

transmit said modified search request; and in response to the number of said search responses exceeding said maximum response threshold, and prior to said transmission of said modified search request, transmit one or more frames to change a device subnet specifier of one of said plurality of other electronic devices, wherein said one of said plurality of other electronic devices compares said device subnet specifier against a frame subnet specifier of a particular frame during a determination of whether to respond to said particular frame.

8. The system of claim 1, wherein said circuitry is operable to determine said maximum response threshold based on network conditions, condition or status of requesting devices, and/or reception related parameters.

9. A system comprising an electronic device that comprises a communication interface for communication over a physical medium, said electronic device being operable to:

determine, after reception of a plurality of search responses from a plurality of other electronic devices, whether the number of said search responses exceeds a maximum response threshold, wherein the search responses are triggered by a first search request transmitted by said electronic device;

when the number of said search responses exceeds said maximum response threshold, generate a modified search request to reduce number of expected search responses;

transmit said modified search request; and determine said maximum response threshold based on a number of data collisions occurring in said physical medium.

10. The system of claim 4, comprising varying said maximum response threshold as a number of available channels on said network varies.

11. The system of claim 4, comprising varying said maximum response threshold as energy available from a power supply of said electronic device varies.

12. The system of claim 1, comprising a first one of said plurality of other electronic devices, wherein said first one of said plurality of other electronic devices is operable to:

receive said first search request and said modified search request; and apply a multi-stage filtering to said first search request, wherein each stage of said multi-stage filtering comprises a validation check, and a failure of any said validation check when processing said first search request terminates said processing of said first search request.

13. The system of claim 12, wherein said electronic device is operable to apply, in a first stage of said multi-stage filtering, an error detection check to determine whether said first search request was not corrupted during communication over said physical medium.

14. The system of claim 13, wherein said error detection check comprises a validation based on cyclic redundancy check (CRC) value associated with said first search request.

15. The system of claim 12, wherein said electronic device is operable to apply, in a stage of said multi-stage filtering, a check that a difference between a received signal strength of said first search request and a transmitted signal strength of said first search request is within determined limits.

16. The system of claim 15, wherein said transmitted signal strength is indicated in a field of said first search request.

* * * * *